(12) United States Patent
Bildhauer et al.

(10) Patent No.: US 11,044,175 B2
(45) Date of Patent: Jun. 22, 2021

(54) HYBRID CLOUD BROKER WITH STATIC AND DYNAMIC CAPABILITY MATCHING

(71) Applicant: INTERNATIONAL BUSINESS MACHINES CORPORATION, Armonk, NY (US)

(72) Inventors: Georg Bildhauer, Nufringen (DE); Martin Henke, Reutlingen (DE); Juergen Schneider, Althengstett (DE); Torsten Teich, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 636 days.

(21) Appl. No.: 15/333,335

(22) Filed: Oct. 25, 2016

(65) Prior Publication Data

US 2018/0115468 A1 Apr. 26, 2018

(51) Int. Cl.
*H04L 12/24* (2006.01)
*H04L 29/08* (2006.01)
*G06F 9/50* (2006.01)

(52) U.S. Cl.
CPC ........ *H04L 41/5058* (2013.01); *G06F 9/5044* (2013.01); *G06F 9/5055* (2013.01);
(Continued)

(58) Field of Classification Search
CPC .................................................. H04L 41/5058
See application file for complete search history.

(56) References Cited

U.S. PATENT DOCUMENTS

| | | | |
|---|---|---|---|
| 8,365,169 B1 * | 1/2013 | Watson | G06F 9/4856 718/1 |
| 9,286,104 B1 * | 3/2016 | Ghosh | G06F 9/45558 |

(Continued)

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

(Continued)

*Primary Examiner* — Andrew C Georgandellis
(74) *Attorney, Agent, or Firm* — Brian Restauro; George S. Blasiak; Heslin Rothenberg Farley & Mesiti PC

(57) ABSTRACT

A method for enhancing a service delivery system with a multi-staged broker may be provided. The multi-staged broker may be suited for a placement of a service. The delivery system accesses at least two infrastructure systems offering services for deploying service resources. The at least two infrastructure systems are operated by different service providers. The method comprises collecting static and dynamic capabilities of the two infrastructure computing systems, combining the static capabilities and the dynamic capabilities for determining a first most suitable infrastructure system for deploying a service requiring a computing environment satisfying attribute values of a service capability profile, deploying the service on the first most suitable infrastructure system. The method comprises also receiving an event indicative of a change, reassessing most suitable infrastructure system and repeating the combining for determining a second most suitable infrastructure system, and redeploying the service on the second most suitable infrastructure system.

19 Claims, 15 Drawing Sheets

(52) U.S. Cl.
    CPC ...... *H04L 41/5019* (2013.01); *H04L 67/2809*
        (2013.01); *H04L 41/5009* (2013.01); *H04L*
                                *67/1097* (2013.01)

(56) References Cited

U.S. PATENT DOCUMENTS

| | | | |
|---|---|---|---|
| 9,473,374 B2 | 10/2016 | Beaty et al. | |
| 2012/0254866 A1* | 10/2012 | Iwamatsu | G06F 9/45558 |
| | | | 718/1 |
| 2012/0304176 A1* | 11/2012 | Takeda | G06F 9/4856 |
| | | | 718/1 |
| 2013/0014103 A1* | 1/2013 | Reuther | G06F 3/0647 |
| | | | 718/1 |
| 2014/0173112 A1 | 6/2014 | Seago et al. | |
| 2014/0298333 A1* | 10/2014 | Yoshida | G06F 9/5088 |
| | | | 718/1 |
| 2014/0351402 A1 | 11/2014 | Madani et al. | |
| 2015/0026349 A1 | 1/2015 | Iyoob | |
| 2015/0180949 A1 | 6/2015 | Maes et al. | |
| 2015/0193128 A1* | 7/2015 | Luft | G06F 9/45558 |
| | | | 715/765 |
| 2019/0230160 A1 | 7/2019 | Eda et al. | |

OTHER PUBLICATIONS

Qian, Hangwei, et al. "CSS: Facilities the Cloud Service Selection in IaaS Platforms." Collaboration Technologies and Systems (CTS), 2013 International Conference on, (pp. 347-354). IEEE, 2013.

\* cited by examiner

| Capability ID | Capability Type | Value |
|---|---|---|
| CA001 | CT001 | Europe |
| CA002 | CT001 | North America |
| CA003 | CT001 | Japan |
| CA004 | CT002 | East |
| CA005 | CT002 | West |
| CA006 | CT003 | On premise |
| CA007 | CT003 | Off premise |
| CA008 | CT012 | Dedicated |
| CA009 | CT012 | Shared |
| CA010 | CT004 | My Company |
| CA011 | CT004 | IBM Softlayer |
| CA012 | CT004 | Amazon |
| CA013 | CT004 | Microsoft |
| CA014 | CT005 | Banking |
| CA015 | CT005 | Insurance |
| CA016 | CT005 | Data Mining |
| CA017 | CT005 | B2B |
| CA018 | CT005 | B2C |
| CA019 | CT006 | 5 nines (99.999%) |
| CA020 | CT006 | 4 nines (99.99%) |
| CA021 | CT007 | IaaS – Compute |
| CA022 | CT007 | IaaS – Block Storage |
| CA023 | CT007 | IaaS – File Based Storage |
| CA024 | CT007 | IaaS – Software Defined Network |
| CA025 | CT007 | CRM as a Service |
| CA026 | CT007 | Database as a Service |
| CA027 | CT007 | WebSphere Container |
| CA028 | CT010 | Safe Harbor |
| ... | | |

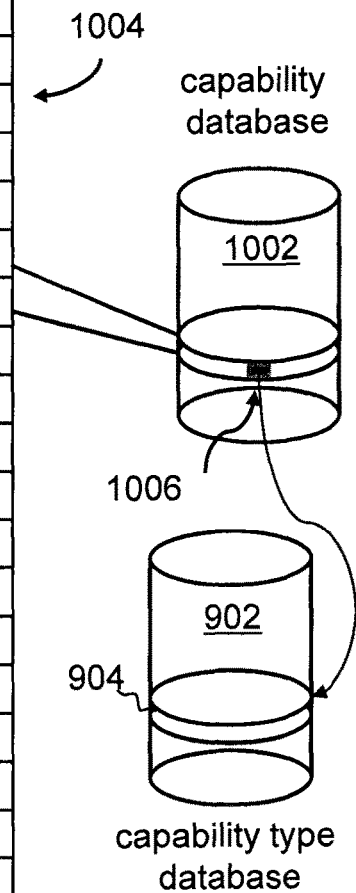

FIG. 10

| Service Definition ID | Service Name | Part | Requirements | Policies |
|---|---|---|---|---|
| SD001 | Customer Relationship Management Application | 1 | MUST(CA019 OR CA020) AND (CA008 OR (CA009 AND CA014 AND NOT CA018)) AND MUST CA025 AND MAY(CA006 OR (CA007 AND CA028)) | Unique(CT001); Unique(CT001, CT002); Distinct(CT004); Minimize(CT008); Maximize(CT006); Ask_Watson(CT010); Approve(any); ... |
|  |  | 2 | MUST(CA019 OR CA020) AND (CA008 OR (CA009 AND CA014 AND NOT CA018)) AND MUST CA025 AND MAY(CA006 OR (CA007 AND CA028)) |  |
| SD002 | ... |  |  |  |

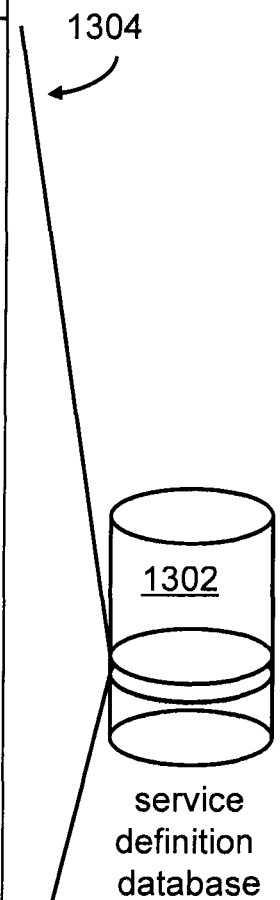

1304

1302 service definition database

FIG. 13

Fig. 11 - Example of a Service Definition database record

HYBRID CLOUD BROKER WITH STATIC AND DYNAMIC CAPABILITY MATCHING

TECHNICAL FIELD

The invention relates generally to a method for managing cloud services, and more specifically, to a method for enhancing a service delivery system with a multi-staged broker. The invention relates further to a system for enhancing a service delivery system with a multi-staged broker, and a computer program product.

BACKGROUND

With the advent of cloud computing the information technology industry has been undergoing structural changes. These changes not only affect information technology companies themselves, but also the industry in general for which information technology has become an essential part of their business operations. IT departments face the need of providing infrastructure faster, driven by their lines of business, internal clients, suppliers and external customers. On the other hand, the pressure on cost effectiveness and quality of service continue to be very high. A high level of security is of utmost importance. Cloud computing environments have to fulfill similar requirements as traditional data centers in this regard, but are perceived to provide services faster and cheaper, and to have virtually endless resources available.

There is a plurality of cloud infrastructure providers on the market today, each of them offering specific services with service levels, targeting specific use cases, groups of clients, vertical and geographic markets. These cloud providers compete with services of traditional IT service providers which are operated typically in on-premise environments of client owned datacenters. While cloud providers seem to have advantages over said company-owned datacenters, they are not under direct control of the client companies and there is a substantial risk of failure to provide agreed service levels.

Furthermore, cloud service providers might change their service levels, prices, and service offerings more often than traditional on-premise (owned by the service consumer) information technology providers.

Therefore, a serious design of a business application topology (or business service topology in general) and the placement thereof as well as an associated selection of the right service infrastructure provider(s) is of the essence in order to fulfil and maintain required service levels. Selecting and administering said application topology according to prior art typically comprises a process with little flexibility and adaptability to changes. Often manual interventions are required by operators.

SUMMARY

According to one aspect of the present invention, a method for enhancing a service delivery system with a multi-staged broker may be provided. The service delivery system may access at least two infrastructure systems offering services for deploying and managing service resources. The at least two infrastructure systems may be operated by different service providers. The method may comprise collecting static capabilities of the at least two infrastructure computing systems using the multi-staged broker, collecting dynamic capabilities of the at least two infrastructure computing systems using the multi-staged broker, and combining the static capabilities and the dynamic capabilities for determining a first most suitable infrastructure system for deploying a service requiring a computing environment satisfying attribute values of a service capability profile.

The method may further comprise deploying the service on the first most suitable infrastructure system, receiving an event indicative of a change of one out of the group comprising the static capabilities, the dynamic capabilities, and the capability profile, and reassessing the determination regarding the most suitable infrastructure system and repeating the combining the static capabilities and the dynamic capabilities for determining a second most suitable infrastructure system for deploying the service satisfying the attribute values of the service capability profile, as well as redeploying the service on the second most suitable infrastructure system.

According to another aspect of the present invention, a system for enhancing a service delivery system with a multi-staged broker module may be provided. The service delivery system may access at least two infrastructure systems offering services for deploying and managing service resources. The at least two infrastructure systems may be operated by different service providers. The system may comprise a first collection unit adapted for collecting static capabilities of the at least two infrastructure computing systems using the multi-staged broker module, a second collection unit adapted for collecting dynamic capabilities of the at least two infrastructure computing systems using the multi-staged broker module, and a combining module adapted for combining the static capabilities and the dynamic capabilities for determining a first most suitable infrastructure system for deploying a service requiring a computing environment satisfying attribute values of a service capability profile.

Moreover, the system may comprise a deploying unit adapted for deploying the service on the first most suitable infrastructure system, a receiver adapted for receiving an event indicative of a change of one out of the group comprising the static capabilities, the dynamic capabilities, and the capability profile, and a reassessment unit adapted for reassessing the determination regarding the most suitable infrastructure system and repeating the combination the static capabilities and the dynamic capabilities for determining a second most suitable infrastructure system for deploying the service satisfying the attribute values of the service capability profile, as well as a redeployment unit adapted for redeploying the service on the second most suitable infrastructure system.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Figure 1:
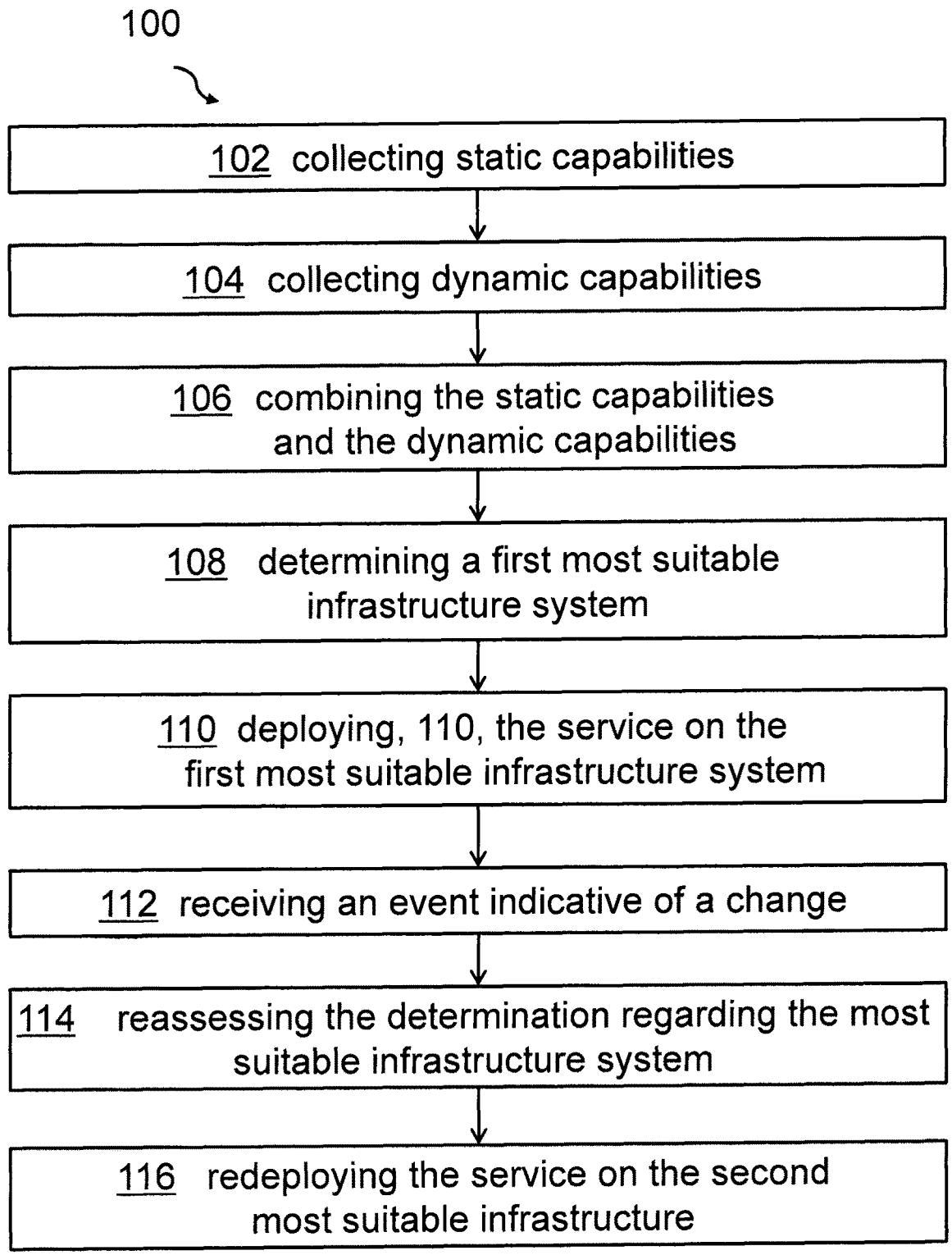
Figure 2:
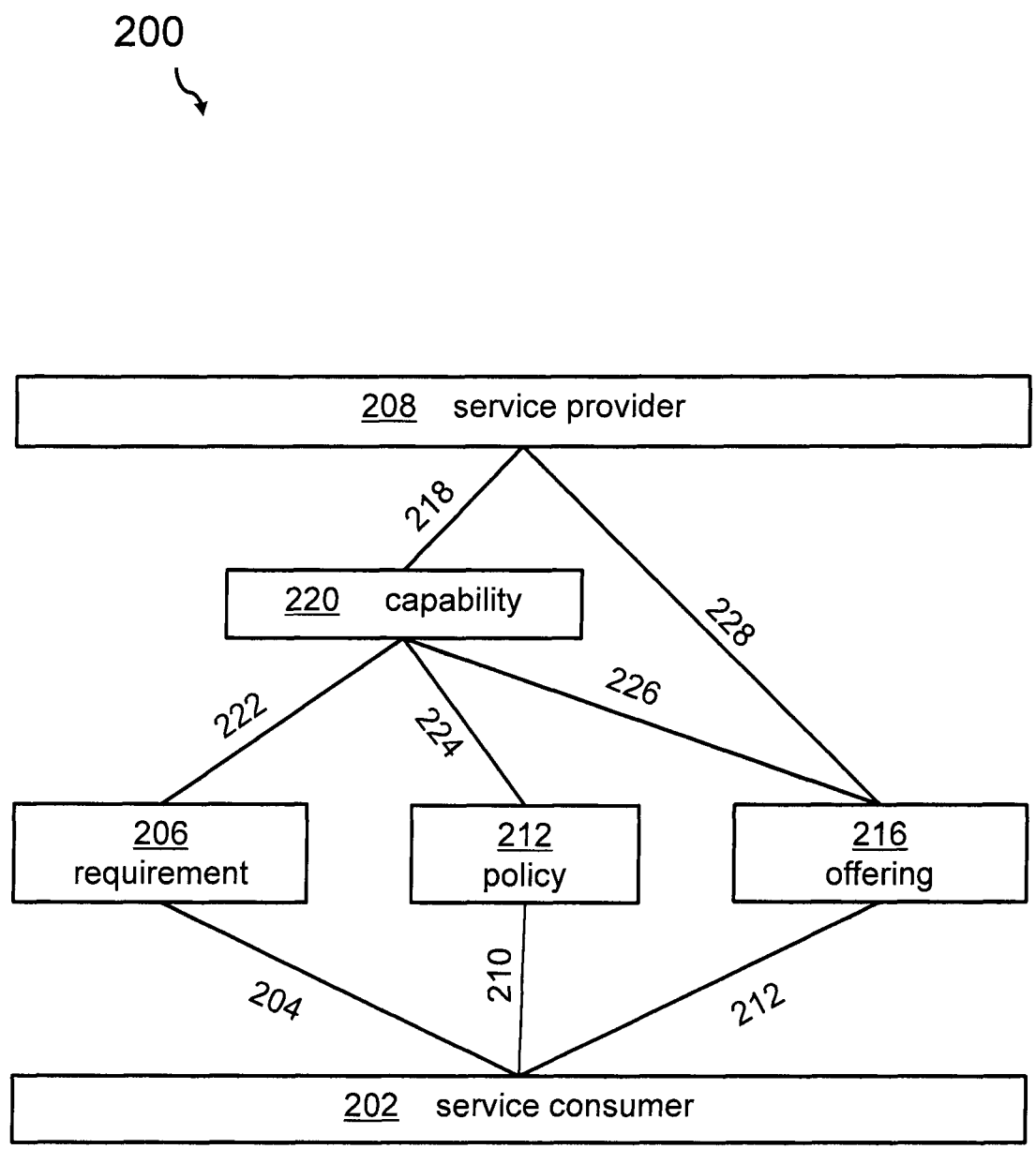

Preferred embodiments of the invention will be described, by way of example only, and with reference to the following drawings:

FIG. 1 shows a block diagram of an embodiment of the inventive method for enhancing a service delivery system with a multi-staged broker FIG. 2 shows involved entities in the method.

Figure 3:
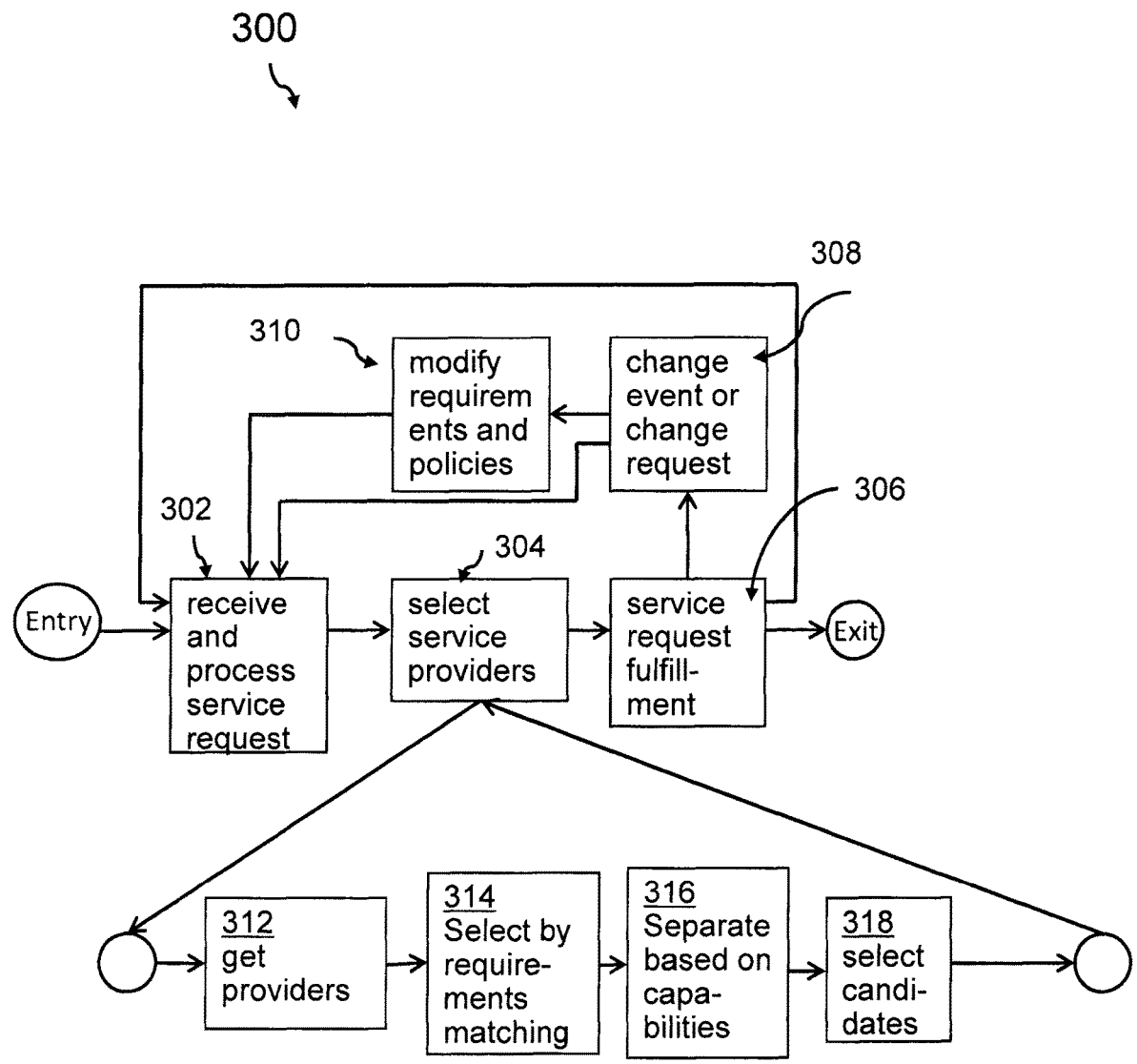

FIG. 3 shows a more detailed implementation embodiment with a plurality of method steps.

Figure 4:
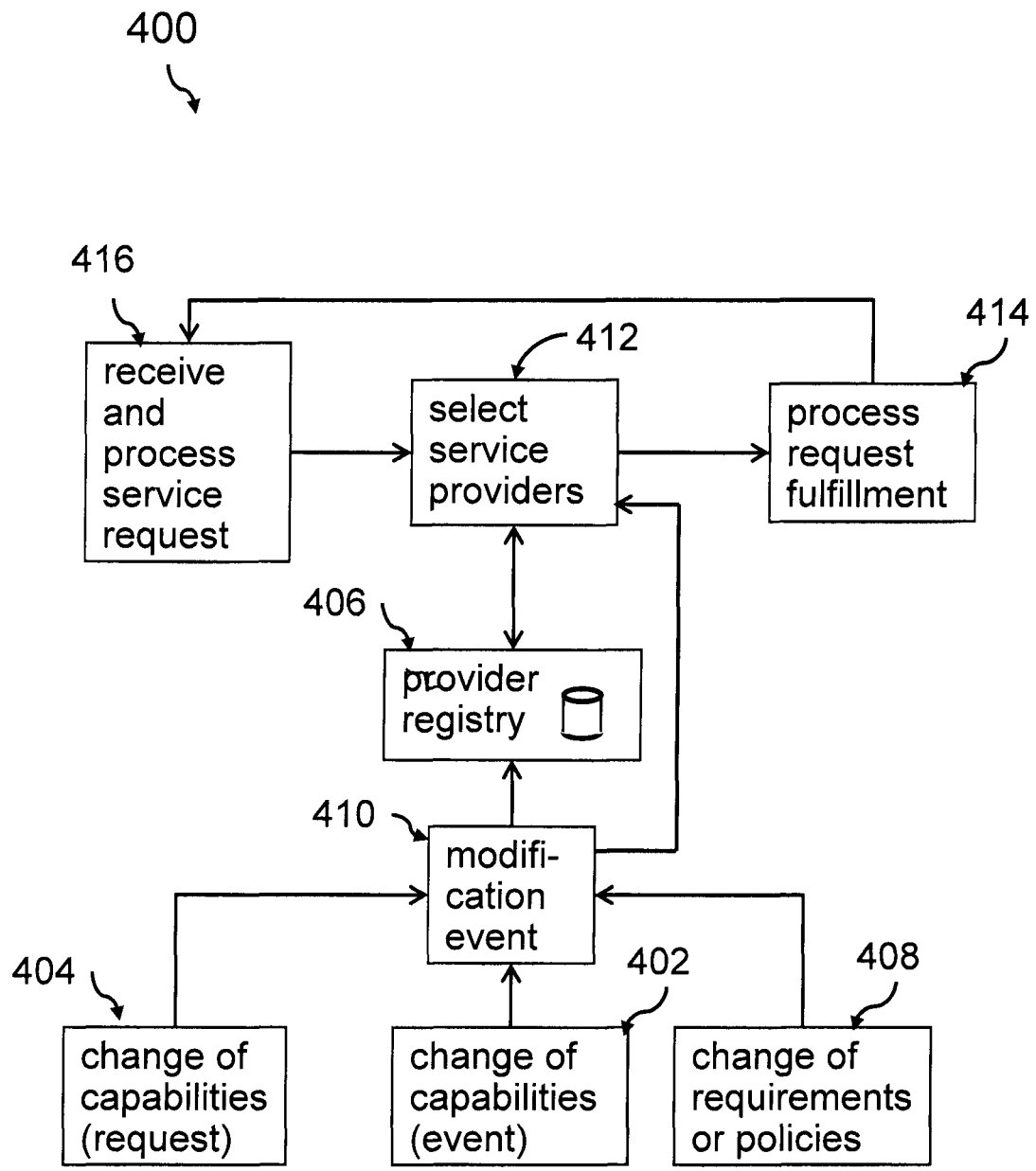

FIG. 4 shows a service broker change processor suitable for a change of the service provider.

Figure 5:
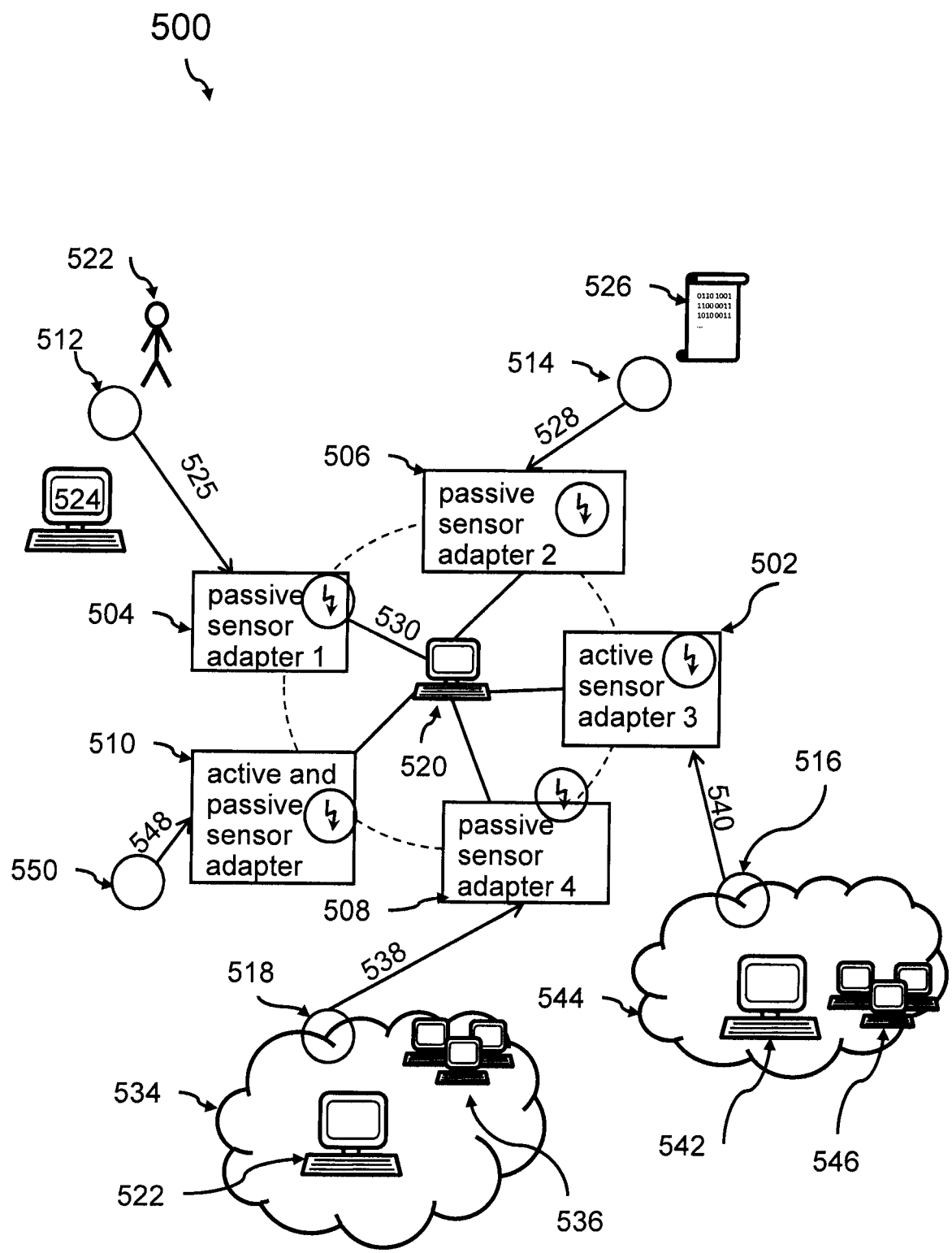

FIG. 5 shows an embodiment of data sensing and sensor types implemented to execute the method.

Figure 6:
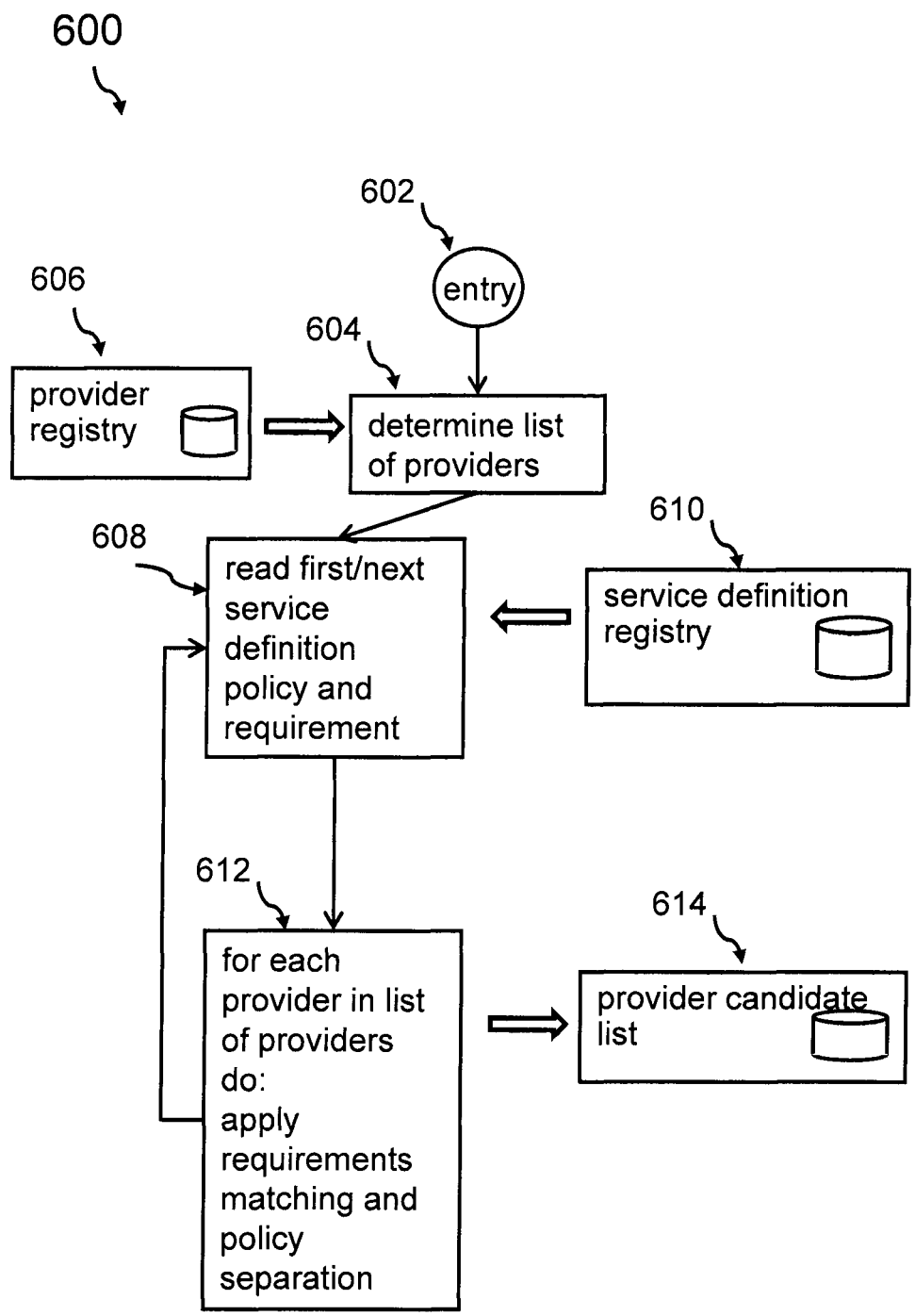

FIG. 6 shows an embodiment of a requirement, policy and capability matching automat.

Figure 7:
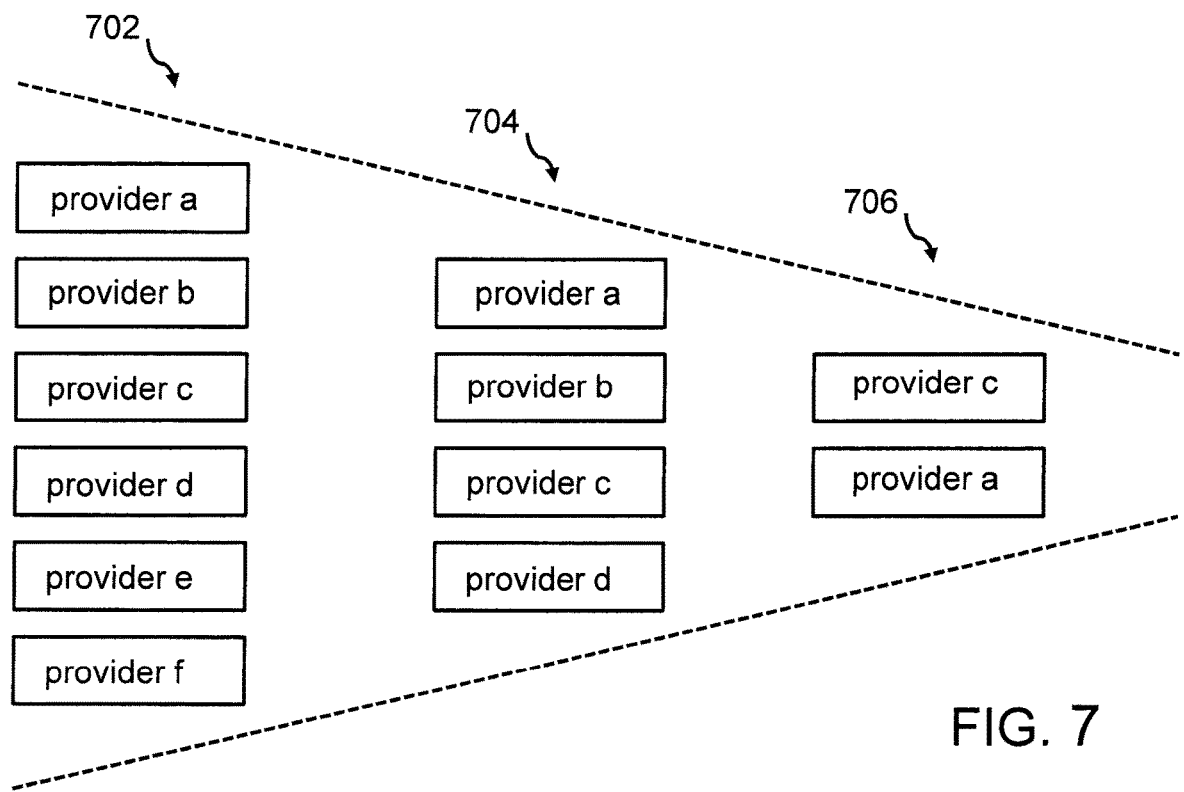

FIG. 7 shows an embodiment of a cloud provider selection process.

Figure 8:
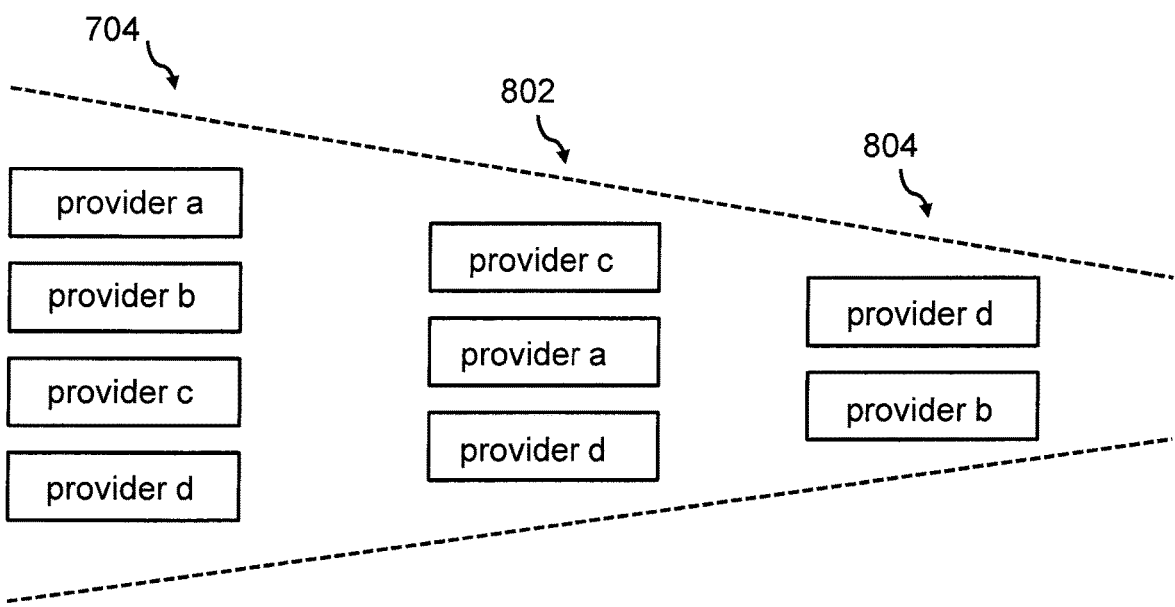

FIG. 8 shows an embodiment of a cloud service provider selection process with chained policies of the same category.

Figure 9:
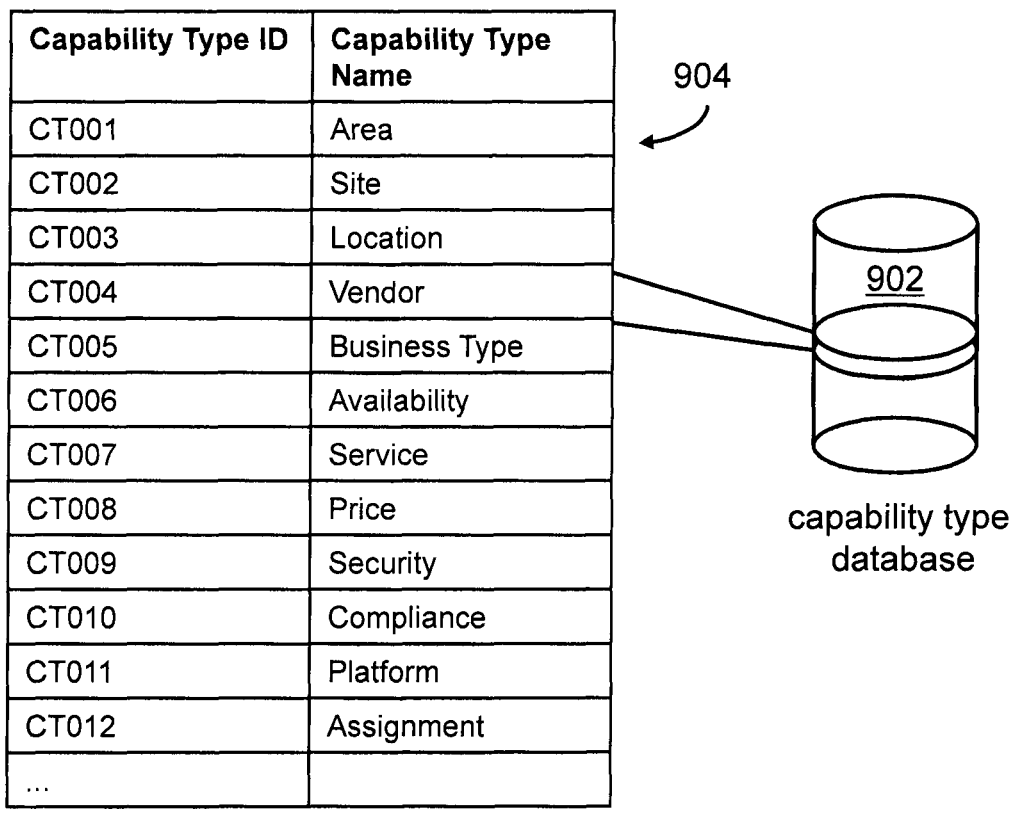

FIG. 9 shows an embodiment of a capability type database record.

FIG. 10 shows a capability database and appropriate capability records as created by the service administrator.

Figure 11:
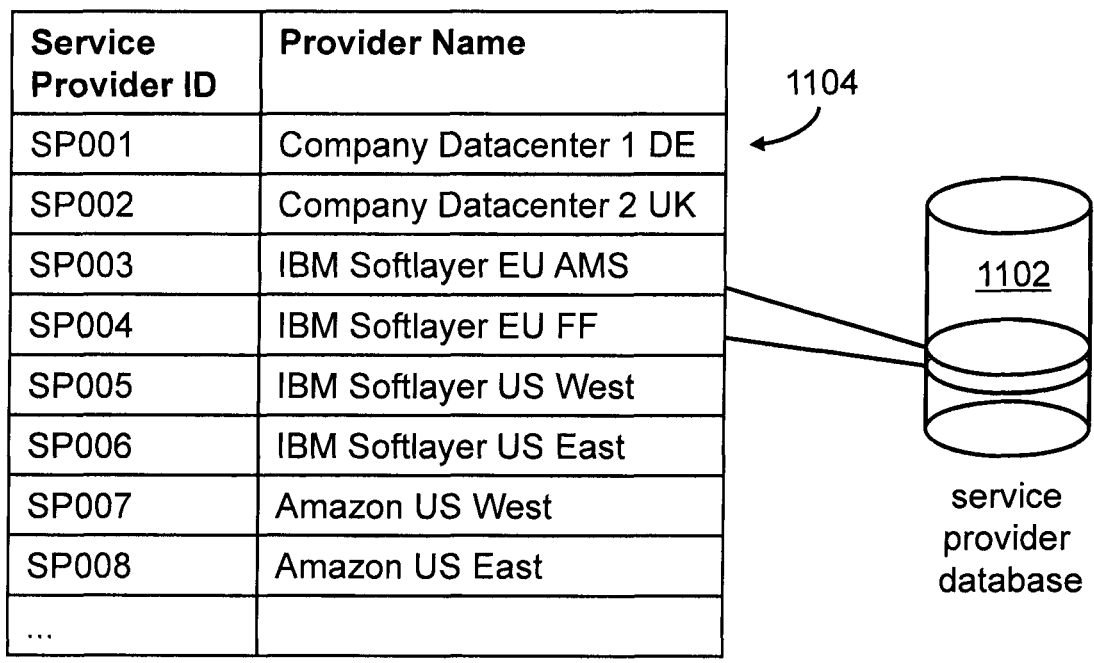
Figure 12:
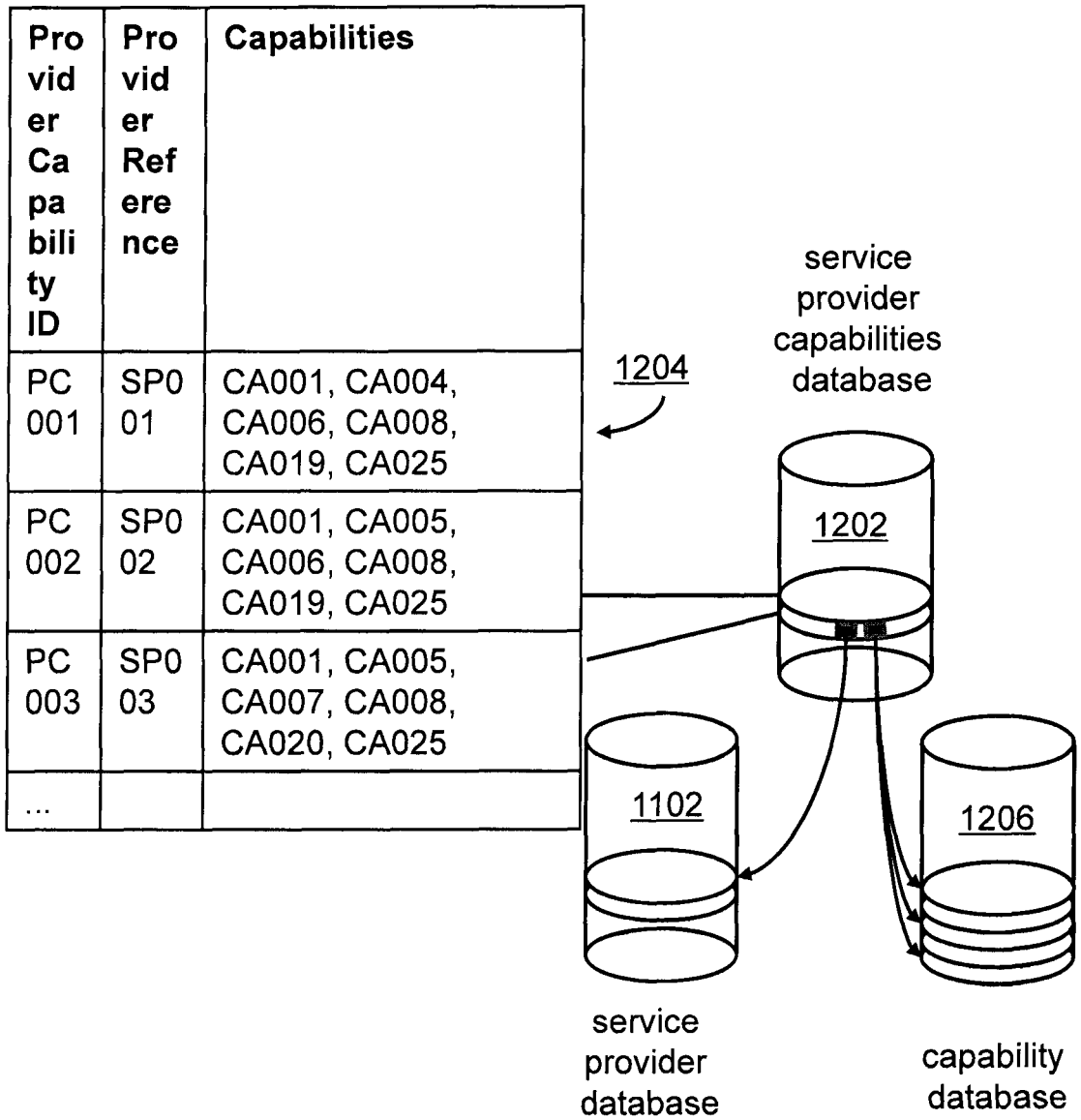

FIGS. 11 and 12 depict a preferred embodiment of a service provider registry, whereupon the service provider database stores associated service provider records.

FIG. 13 shows a preferred embodiment of a service definition.

Figure 14:
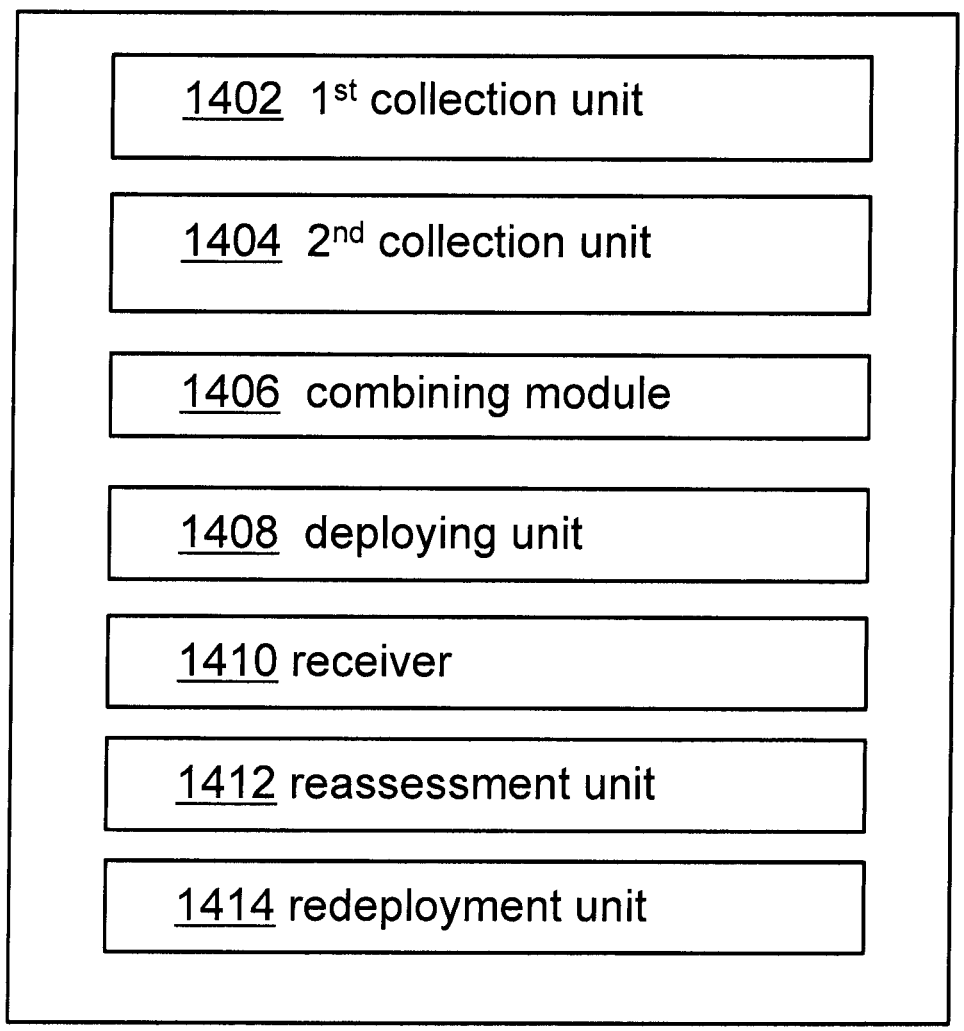

FIG. 14 shows an embodiment of a system 1400 for enhancing a service delivery system with a multi-staged broker module for a placement of a service.

Figure 15:
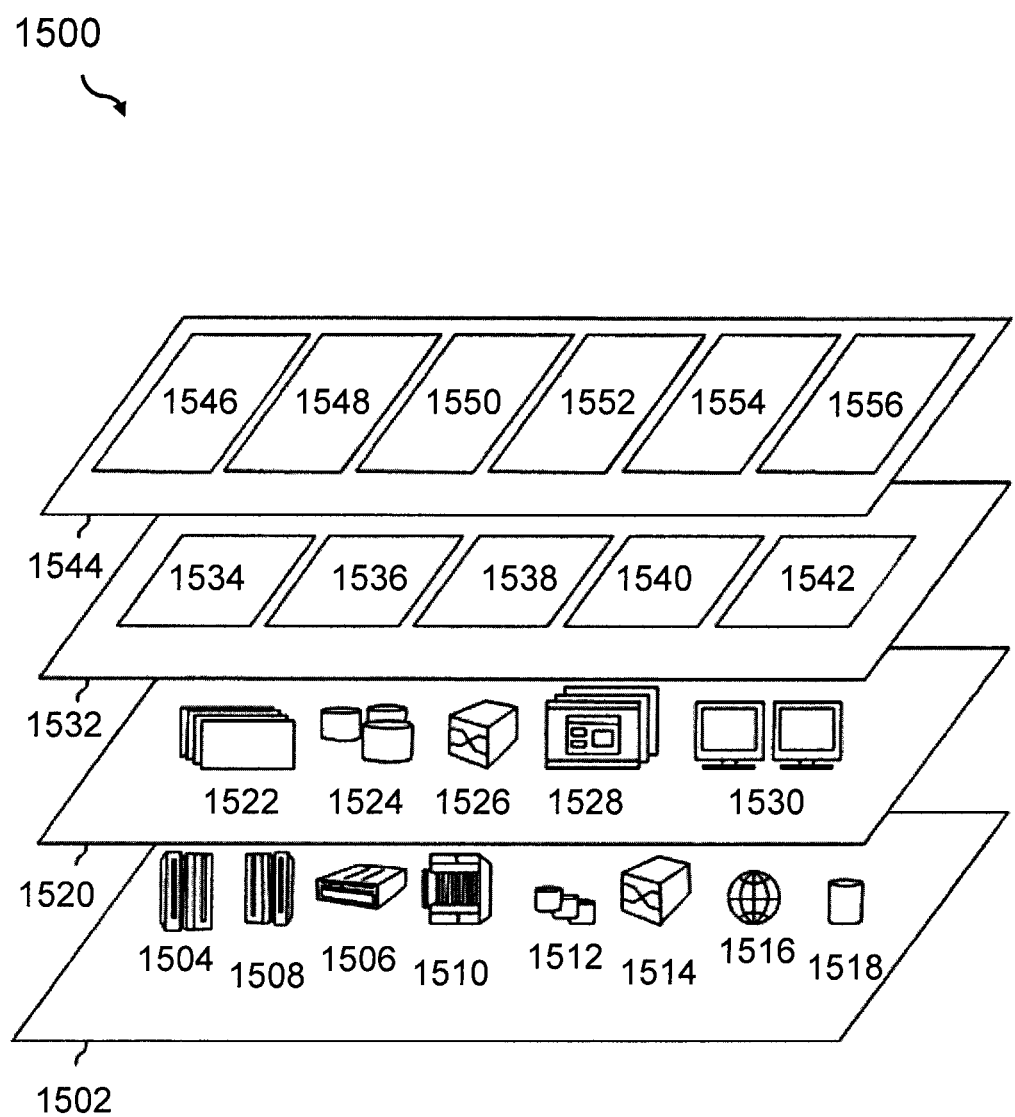

FIG. 15 shows a cloud computing environment in which at least parts of the inventive concept may be deployed.

Figure 16:
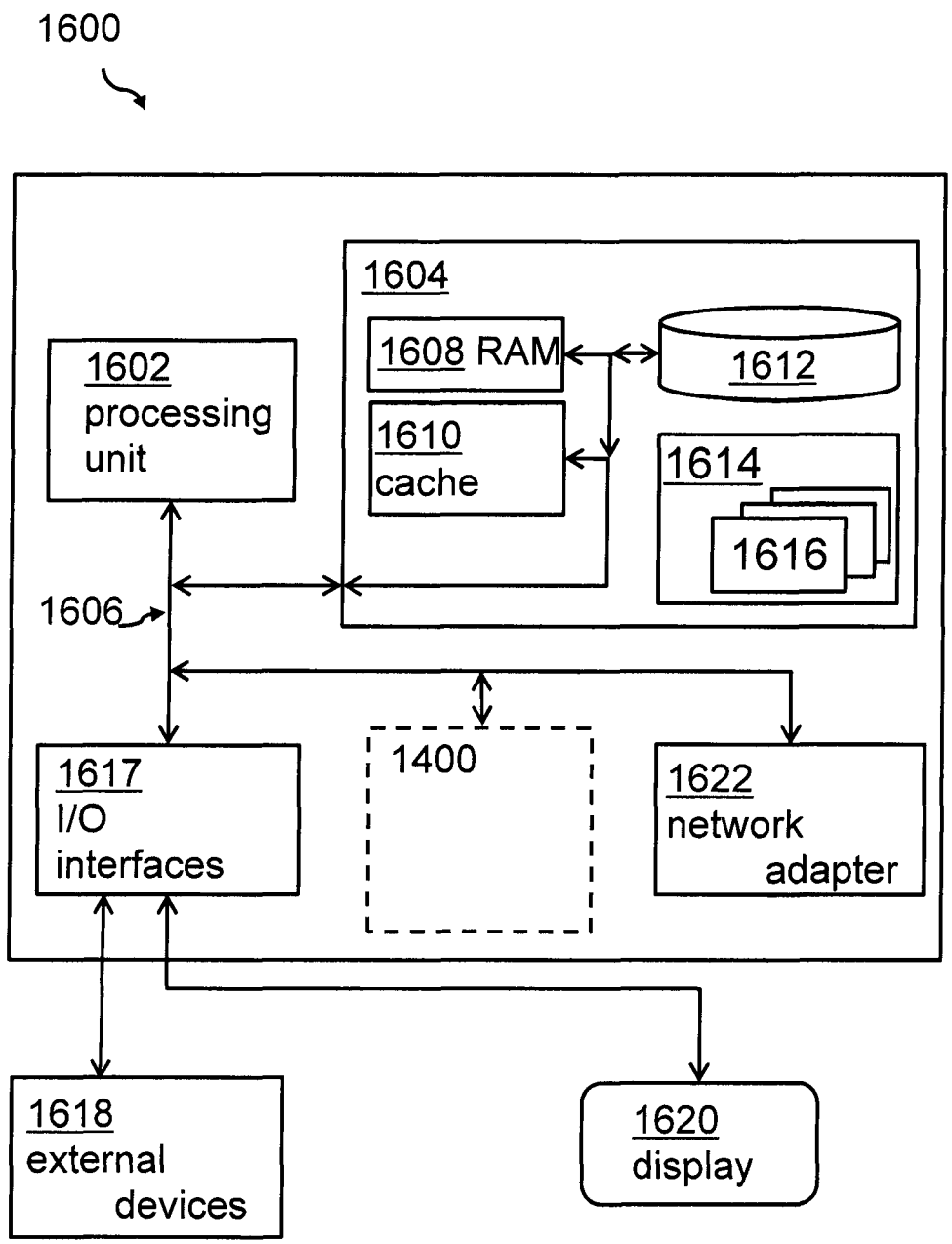

FIG. 16 shows a computing system suitable for executing program code related to the proposed method.

DETAILED DESCRIPTION

In the context of this description, the following conventions, terms and/or expressions may be used:

The term 'service delivery system' may denote a computing system adapted for a delivery of a computer based service, like, e.g., a calculation, storing data, performing a transaction, executing a computerized process, performing an archive process, or the like. The service may be delivered by different and/or changing resources.

The term 'multi-staged broker' may denote a software agent or a dedicated module implemented in hardware adapted for selecting a service infrastructure or computing infrastructure, like, e.g., a computing system, a storage system, and interactive system, an archiving system and/or a general purpose computing system, based on pre-defined parameters like a service capability rule and/or a plurality of such rules.

The term 'placement of a service' may denote sending a service—which may be implemented as a software program—to an infrastructure, enabled to execute the service and deliver the expected results. The placement of a service may be done to a first service infrastructure at one point in time and to another service infrastructure at another point in time.

The term 'infrastructure system' may denote a computing environment like a general purpose computing environment. It may comprise a processor, main memory, and peripheral devices like storage and the like. It may also be implemented as a virtual platform, like a virtual machine.

The term 'services' may denote a computer program adapted for delivering a result. That may be a result of a mathematical expression, a storage process, a result of a transaction, etc.

The term 'service resource' may denote a computerized infrastructure component required to fulfil a service promise. A service resource may be a computer, a network, a storage system, etc.

The term 'service provider' may denote the company running the service delivery resources. Sometimes also the data center itself—depending on the context—may be denoted service provider.

The term 'capability' may denote individual characteristics of service resource or an infrastructure system comprising service resources. A simple capability may be related to the location the infrastructure system is running geographically and/or in relationship to a specific customer, i.e., on-premise vs. off-premise.

The term 'dynamic capabilities' may denote characteristics that may be changed over time. They may change in short time intervals or in longer time intervals and they are not static.

The term 'service capability profile' may denote a multitude of capability requirements of a given service. The related rules and/or policies may be nested or chained. Each capability may have a related capability value in order to specific the requirement in a numeric way.

The term 'cloud computing' may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models and four deployment models.

Essential characteristics of cloud computing comprise (i) On-demand self-service. A consumer can unilaterally provision computing capabilities, such as server time and network storage, as needed automatically without requiring human interaction with each service provider.

(ii) Broad network access. Capabilities are available over the network and accessed through standard mechanisms that promote use by heterogeneous thin or thick client platforms (e.g., mobile phones, laptops, and PDAs).

(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud Computing used comprise:

(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.

(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise (i) Private cloud. The cloud infrastructure is operated solely by an organization. It may be managed by the organization or a third party and may exist on premise or off premise.

(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.

(iii) Public cloud. The cloud infrastructure is made available to the general public or a large industry group and is owned by an organization selling cloud services.

(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness, low coupling, modularity, and semantic interoperability.

The proposed method for enhancing a service delivery system with a multi-staged broker may offer multiple advantages and technical effects:

The service delivery of a service being deployed in a hybrid cloud environment is enhanced significantly. As competition between cloud service providers is getting more intense, while at the same time the number of infrastructures offered as a service is increasing, enterprises having a need for deploying a specific service have more choice between providers. On the other side, the broad spectrum of service provider's offerings may be a burden. At the same time, cloud service providers frequently change their offerings, availability of their infrastructure, granularity of their services and finally related costs. However, an enterprise wanting to deploy a service may want to achieve an optimal balance between ease of operation, security, performance and related costs. Such a balance may have varying and time-dependent optimization points. On the other side, the offerings of the service providers are also varying and time-dependent.

The multi-staged broker enables an automatic and dynamic placement of services among a plurality of different cloud service providers offering infrastructure services. The multi-staged broker takes into account varying requirements, i.e., expressed as values in the service capability profile, as well as varying offerings of cloud service providers. The decision on which cloud infrastructure a specific service is deployed may be performed by the multi-stage broker completely automatically. At one point in time, the deployment may be done on a first cloud computing environment, and at a second point in time, another cloud computing provider or infrastructure provider may be selected for a deployment of the same service.

For such a purpose, static and dynamic parameters of the used cloud computing environment are continuously measured and assessed in order to determine the most suitable infrastructure system for deploying a specific service. In order to allow such a determination, the service today deployed has a related service capability profile defining conditions for a deployment of the service. However, attribute values of the service capability profile may change over time. This, as well as changing static and dynamic capabilities of the cloud computing environments of different cloud service providers is captured continuously. In case of one of the required attribute values change, more than a predefined threshold value, in event or alert may be triggered.

This may allow the multi-staged broker to make a new determination for a redeployment of the service in a different cloud computing environment. Thus, it may be guaranteed dynamically that the service may always run in the most suitable infrastructure system according to the conditions defined by the capability profile. No human or operator intervention is required to deploy a given service in an optimized cloud computing environment in a hybrid cloud system. Depending on the nature of the attributes and attribute values of the capability profile, the selection process for the cloud computing environment may have different characteristics: it may be more static or more dynamic; a higher priority may be given to a higher performance of the infrastructure, to lower costs, or to an optimal equilibrium between costs and performance. The conditions may be changed at every point in time by an operator or, in a more advanced environment, also by machine generated decisions which may influence the capability profile, it's attributes and its related attribute values. Thus, a given service may always be performed under time-dependent conditions in an environment satisfying multiple constraints at the same time. Such capabilities mark advantages over known static selection processes for cloud computing resources insofar it automates and optimizes the decision process which offering of which cloud service provider is used at the time a service deployment is requested.

Additionally, the multi-staged broker may be implemented in existing hybrid cloud computing environments requesting services from a plurality of different cloud service providers. Thus, already make investments can be protected. And it does not play a role whether elements of the hybrid cloud computing environment is deployed on-premise, off-premise or a mixture of both.

Using the proposed method and system, cost savings may be achieved because real-time spot prices for computing resources may advantageously be used, the predefined compliance guidelines may be followed in a guaranteed way, and failures may be reduced by choosing the most reliable cloud service provider. Additionally, business continuity may be guaranteed because in case of a failing cloud computing infrastructure the service was running on and the generated event for a reassessment, a new most suitable infrastructure system may be selected instantly.

It may also be noted that the capability profile used for a determination of a most suitable infrastructure system may comprise chained conditions, i.e., one rule may be used before another one—nested deeper—may be used. Thus, it may allow for a complete freedom in defining dynamic selection conditions and associated rules for selecting infrastructure systems or infrastructure services.

According to a preferred embodiment of the method, the collecting static capabilities may comprise receiving messages by the multi-staged broker from a sensory adapter connected to at least one of the at least two infrastructure systems. The messages may be indicative of static characteristic values of the at least two infrastructure systems. In typical cases, the static capabilities may be received from all connected cloud systems. This may allow an assessment of generally available performance and/or capability indicators of a dedicated cloud system.

According to another preferred embodiment of the method, the collecting dynamic capabilities comprise receiving messages by the multi-staged broker from the sensory adapter connected to at least one of the at least two infrastructure systems. The messages may be indicative of continuously changing, i.e., dynamic characteristic values of the at least two infrastructure systems. Also here, in a typical case the multi-staged broker may receive data values about dynamic capabilities from all involved cloud systems. It may also be noted that the sensory adapter for the static capabilities and the dynamic capabilities may be different ones. However, this is not a requirement.

According to one advantageous embodiment of the method, combining the static capabilities and the dynamic capabilities may comprise creating at least one capability record representing logically names of capabilities, types of capabilities and/or related type capability values of the at least two infrastructure systems, creating at least one service provider record identifying the service provider by a unique identifier, and determining by the multi-staged broker a list of potential infrastructure systems out of which the most suitable infrastructure system may be selected for a deployment of the service. This may allow building a pool of optional infrastructure systems to choose from when deciding for a new infrastructure systems on which the service may be deployed.

According to an additionally preferred embodiment of the method, the capability profile of the service may comprise at least one out of the group comprising a service description, a service provider name, a unique identifier of a service provider, a capability type name, a capability type identifier, a performance indicator, an operating system indicator, a storage amount indicator, a scaling indicator, a cost indicator, a hardware architecture indicator, a hypervisor type indicator, and an availability guarantee indicator. This may allow the multi-staged broker a first straight forward selection process. However, the required dynamic component, i.e., dynamic capabilities, of the selection process may be harder to compute or determine.

According to a permissive embodiment of the method, the redeploying the service on the first most suitable infrastructure system may comprise stopping the deployment of the service on the first most suitable infrastructure system, i.e., let it fall asleep for a later restart if conditions are more suitable. This may eliminate network traffic when moving the service from one cloud platform to another cloud platform, and potentially back again at a later point in time.

According to one additional embodiment of the method, the redeploying the service on the first most suitable infrastructure system comprises deleting, i.e., removing the service on the first most suitable infrastructure system. Thus, this infrastructure system may be freed of overhead to be managed which may enhance the overall performance when looking across involved cloud systems.

According to one additionally advantageous embodiment of the method, the reassessing the determination regarding the most suitable infrastructure system may be performed periodically and/or at predefined points in time and/or upon receiving the event. This may allow for a flexibility in configuring a reselection of a cloud infrastructure out of a plurality of different cloud infrastructure systems.

In the following, a detailed description of the figures will be given. All instructions in the figures are schematic. Firstly, a block diagram of an embodiment of the inventive method for enhancing a service delivery system with a multi-staged broker is given. Afterwards, further embodiments as well as embodiments of the system for enhancing a service delivery system with a multi-staged broker will be described.

FIG. 1 shows a block diagram of an embodiment of the method 100 for enhancing a service delivery system, e.g., a hybrid cloud system, with a multi-staged broker for a placement of a service, e.g., a cloud delivered service. The service delivery system accesses at least two infrastructure systems—like an IaaS (Infrastructure-as-a-Service), a PaaS (platform-as-a-service), SaaS (Software-as-Service), StaaS (Storage-as-a-Service, or similar)—offering services, e.g., computing power, for deploying and managing service resources. The at least two infrastructure systems are operated by different service providers, e.g., cloud ISPs (Internet Service Provider). The method comprises collecting, 102, static capabilities of the at least two infrastructure computing systems using the multi-staged broker, collecting, 104, dynamic capabilities of the at least two infrastructure computing systems using the multi-staged broker, and combining, 106, the static capabilities and the dynamic capabilities for determining, 108, a first most suitable infrastructure system for deploying a service requiring a computing environment satisfying attribute values of a service capability profile.

Moreover, the method comprises deploying, 110, the service on the first most suitable infrastructure system, receiving, 112, an event indicative of a change of one out of the group comprising the static capabilities, the dynamic capabilities, and the capability profile—meaning that somethings has changed—and reassessing, 114, the determination regarding the most suitable infrastructure system and repeating, i.e., repeating the selection process, the combining the static capabilities and the dynamic capabilities for determining a second most suitable infrastructure system for deploying the service satisfying the attribute values of the service capability profile, and redeploying, 116, the service on the second most suitable infrastructure system. Depending on the reassessment, the first infrastructure system may be the same as the second infrastructure system. However, although something has changed in the conditions, it may always be ensured that the most suitable infrastructure system is being used by the service.

FIG. 2 shows involved entities in the method. The entities involved in the present method and system as well as the relationships among these are depicted in the entity relationship diagram 200 of FIG. 2. These are one or many service consumers 202 having, 204, one or many requirements of functional and non-functional nature 206 for a service provider 208, in addition the service consumer 202 having defined, 210, one or many policies 212 under which he wants services to be established. In order to request and establish services, the service consumer 202 uses, 214, one or multiple service offerings 216. The service brokerage described in the present disclosure consist of a selection of one or multiple service providers 208 having, 218 one or multiple capabilities 220 based on a matching, 222, of the capabilities 220 against requirements and a filtering 224 dependent on said policies 212. The offering 216 orchestrates, 226, 228, the service provider brokerage and service fulfillment process. In the current document the system that implements the techniques set forth hereunder is referred to as "service broker".

When referring to FIG. 2 it may be noted that there may be many internal and external service providers 208 which may offer a plurality of IT, cloud, and generic services with different characteristics (like cost, availability, performance, functions). Additionally, the same service may be offered by private (internal) providers and public (external) providers. The private provider may operate its systems in on premise or off premise locations.

FIG. 3 shows a more detailed implementation embodiment 300 with a series of steps. A service broker automat performs the steps of receiving, 302, requests for services from an external entity, selecting, 304, a service provider which matches the specific requirements of the requesting entity with capabilities of the service providers, fulfilling, 306, the service request, whereupon the fulfillment optionally results in a generation, 308, of a change event or change request and a feedback process, which is controlled by sensor events according to FIG. 5 resulting, 310, in subsequent modification of requirements and policies, the selection of a service provider 208 comprises the steps of getting, 312, a list of available service providers 208, matching, 314, service requirements to service provider capabilities, further separating and filtering, 316, of service provider candidates and finally the selection, 318, a candidate, thus reconfiguring the topology of a cloud service.

FIG. 4 shows a service broker change processor 400 suitable for a change of the service provider 208. The service broker change processor 400 receives one or many events 402 or requests 404 through a sensor system (compare FIG. 5) in order to modify known service provider capabilities which are currently persisted in the provider registry 406 or, receiving requests to modify requirements regarding a service provider or policies under which a service is being selected 408 by creating a modification event 410 and executing the service provider selection process 412 (which executes a sub-process comprising the steps 312, 314, 316, 318 analogue to the selected service provider step 304 of the service broker automat 300 of FIG. 3) and subsequently executing the process request fulfillment 414 in the same way as if it has been initiated by a service requester (compare 416).

FIG. 5 shows an embodiment of data sensoring and sensor types implemented to execute the method. The figure shows a sensor system comprising of active sensor adapters 515, passive sensor adapters 504, 506, 508, and combined active/passive sensor adapters 523, either actively requesting or receiving events from sensors 512, 514, 516, 518, generate trigger change events and send them to said service broker change event feedback processor running on a data processing device 520. In the shown embodiment, an event is input into the system by a person 522 using a computer or terminal 524 which in turn generates a sensor event 512 which is sent, 525, to the related adapter 504. Another event is generated from an electronic message 526 at the sensor 514 which generates and sends 528 it to the respective adapter 506. The adapters are connected 530 with the data processing device 520.

In a third example, an event is generated by a computer or IT device 532 being installed in a cloud computing environment 534 which acts as sensor 518 that receives status information of the cloud computing environment or computing devices 536 located in the cloud computing environment and sends, 538, the event to the adapter 508. One example of an active event sensor is the active sensor adapter 502 which actively detects 540 events generated by an IT device 542 of a cloud computing environment 544 through a sensor 516, the events containing status information about the cloud computing environment 544 or computing devices 546 located in the cloud computing environment 544. Another example of an active event sensor is a combined active and passive sensor adapter 510 which communicates 548 with an event sensor 550. All mentioned sensor adapters act independently and asynchronously.

FIG. 6 shows an embodiment of a requirement, policy and capability matching automat 600. At the beginning 602 it reads the list of potential service providers in step 604 from the provider registry 606, reads the actual service definition with associated requirements and policies in step 608 from the service definition registry 610, executes for each potential service provider the requirement's matching and policy filtering process 612, and updates the list of provider candidates 614. This automat relates to (implements) steps 312, 314, 316, 318 of FIG. 3.

FIG. 7 shows an embodiment of a cloud provider selection process. On the left side, potential cloud service providers 702 are listed: provider "a" to "f". Of those cloud service providers "a" to "d" are known to deliver their services on-premise. From cloud service providers "e" and "f" it is known that they deliver their service in an off-premise mode. Based on this characteristic, which is counted as static capability, a static pre-selection based on the "on-premise" capability is performed. This leaves the second group of cloud service providers 704 in the game. As next step, the dynamic capabilities of these cloud service providers "a" to "d" are investigated. As pre-defined dynamic capability the costs have been selected. This dynamic capability is compared on a price per hour basis. It turns out that cloud service provider "c" delivers its service for 20 Ct/h and cloud service provider "a" delivers its service for 30 Ct/h, compare 706. Consequently, it is determined that cloud service provider "c" will be selected due to fulfilling the combined conditions "on-premise" and "lowest price".

FIG. 8 shows an embodiment of a cloud service provider selection process with chained policies of the same category. As in the example before, a first selection process left the cloud provider 702 "a" to "d" in the game based on the static capability to deliver the cloud service on-premise. In this example, the cloud service providers are ranked based on the first dynamic capability "lowest cost". The result is shown as cloud service providers 802 in which cloud service provider "c", "a" and "d" are ranked according to their price per hour. Again, as in the previous example of FIG. 7, cloud service provider "c" delivers its service for 20 Ct/h, cloud service provider "a" delivers its service for 30 Ct/h, and cloud service provider "d" also delivers its service for 30 Ct/h. Next, an additional selection criterion "most capability" is used as additional dynamic selection policy or dynamic selection rule. Thus, this dynamically rank selection is based on the dynamic capability "most capacity", and it retrieves the available capacity for each of the remaining cloud providers "c", "a", and "d". It turns out that cloud service provider "d" delivers 2 GB on-premise whereas the cloud service provider "c" delivers only 0.5 GB on-premise, compare 804. Hence, the chained selection process allows for a dynamic selection process in which intermediate results may be ranked differently than final results because the conditions for intermediate results are no longer taken into accounts for a next chained selection process. This approach makes the selection process for a cloud service provider flexible and dynamic in contrast to known technologies.

FIG. 9 shows an embodiment of a capability type database record 904. At the time the multi-staged service broker is installed and configured, a service administrator initially defines a set of capability types and stores them in the capability type database 902. These types categorize capabilities, so that they can be used in the subsequent definition of service providers and during the capability filtering. FIG. 9 depicts the capability type database 902 with examples of capability type records 904. Furthermore, and according to FIG. 10, a capability database 1002 and appropriate capability records 1006 are created by the service administrator. The capability records 1006 define capability values which reference appropriate capability types 904 (as stored in the capability type database 902), which saves database space.

FIG. 11 shows an embodiment of service provider database records 1104. When a new service provider is on-boarded then a provider registration record in the provider registry 406 or 606, respectively, is created. Along with the registration record one or multiple records 1104 which describe the capabilities of said provider are stored. FIGS. 11 and 12 depict a preferred embodiment of a service provider registry or database 1102, whereupon the service provider database 1102 stores associated service provider records 1104. The capabilities of each service provider are stored in respective records 1204 in a service provider capability database 1202, whereupon each record contains a reference to the service provider 1102 and references to selected capabilities 1206. Storing the capabilities as references to the capabilities database allows for a fine granular definition of the service provider while keeping the required storage at a minimum.

The business service owner designs the layout of the business services (or business applications respectively) by defining the layout (topology) of the service and by defining functional and non-functional requirements for that service under consideration of specific policies. When a new service definition is generated then a service definition record in the service definition registry 610 (see FIG. 6) is generated. Along with the service definition record one or multiple service policies and requirements associated with said service definition are stored. A preferred embodiment of a service definition is depicted in FIG. 13, which depicts an example of a service definition record 1304 in the service definition database 1302. The present example shows the definition of a Customer Relationship Management (CRM) application. Requirements on the service are that they must be at least 99.99% available (exemplary defined by the term "MUST(CA019 OR CA020)"). The owner allows the service to run either on a dedicated hosting environment or on a shared one—but in case of a shared one only select those which host banking industry clients and exclude those which host services for private individuals (exemplary defined by the term "(CA008 OR (CA009 AND CA014 AND NOT CA018))". The required service type is "CRM as a Service", denoted by "MUST(CA025)". Furthermore the owner allows the service to run in his own (on-premise) or in a remote (off-premise) datacenter but in case of off premise it must be a "Safe Harbor" area (exemplary defined by the term "MAY(CA006 OR (CA007 AND CA028))". Technically, these requirements are terms of logical combinations of capabilities of the form:

[CRITERION][<Capability1>[<CONDITION>[CRITERION]<Capability2>] [ . . . ]

Supported conditions are the logical operations AND, OR, AND NOT, OR NOT, XOR, XOR NOT. Supported criteria (e.g. MUST and MAY) allow to specify which of the conditions are mandatory and which are optional, which in turn allows the business owner to prioritize requirements and causes the broker automat to select providers even if none of the service provider meet all specified requirements.

In the present service definition record 1304, shown in FIG. 13, a service definition contains several (at least one) "part" and associated requirements. This allows for the definition of a hybrid service which may run on a plurality of host platforms operated by many service providers, whereupon in the event of the outage of one service provider or host platform the application or parts of the application will continue to run on the remaining host platform or service provider instances.

Furthermore, as depicted in FIG. 13, the service definition record contains the field "Policies", which may contain one or multiple policies under which the business service owner want the service to be deployed. The technical implementation of said policies may be terms in "polish notation" consisting of an operation and related arguments and have the form:

OPERATION(CapabilityType1[, CapabilityType2[,]])

An OPERATION may be any arbitrary term, but typically is chosen such that it describes the function it implements. Examples of operations are:

"Unique(capability type)"—the value of given capability type must be unique across the service platform parts;

"Unique(capability type1, capability type2)"—the combination of capability1 and capability2 must be unique across the service platform parts;

"Distinct(capability type)"—capabilities of the specified type must be different for each part of the specified service;

"Minimize(capability type)"—service vendors/providers are selected for which the value of the specified capability type is a mathematical minimum;

"Maximize(capability type)"—service vendors/providers are selected for which the value of the specified capability type is a maximum;

"Ask Whatson(capability type)"—service vendors/providers are recommended and selected by IBM Watson®;

"Approve(capability type)"—the Business Services Owner has to approve the selected service provider candidates.

Technically each OPERATION is implemented by a policy plugin. Policies can become quite complex and the advantages of the present concept are that service definitions are stored efficiently, that policies are descriptive, thus, easy to understand and easy to modify, whereupon the complex implementation of the policy is encapsulated in the plugin. Furthermore, an unlimited number of policies may be added to the system, as long as there is enough space to store the related policy plugin modules. Operations may be of static (defined), or of dynamic nature. Dynamic operations may use artificial intelligence or dynamic capabilities as a basis for a service provider selection, for which the described plugin technology provides an advantageous embodiment over statically linked implementations. One example of a dynamic operation set forth in the present disclosure, uses IBM Watson® technology for that purpose (refer to the "Ask_Watson( )" operation in FIG. 13).

When a service consumer requests an instance of a specific service then the service broker automat, according to FIG. 3a, is invoked. The automat selects the service providers which fulfill the requirements and policies according to the service definition record and creates the service instance with its components placed on the resulting service providers.

When capabilities of at least one service provider change then one or multiple events are generated by the sensor system depicted in FIG. 5. Sensor events invoke the service broker change processor, as shown in FIG. 3b. The processor invokes the formerly described service provider selection algorithm, which may lead to a reconfiguration of the service, that is, an exchange of providers and move of existing service components from the current to the new service provider. One service definition policy might be that a service owner has to be informed and has to approve or reject the reconfiguration, whereas in the latter case the reconfiguration is aborted.

Examples of said changed capabilities may include: an outage of a service provider or a specific service offered by a provider, a change of service levels and prices, and many more.

Changes of a service definition (either through a change of a requirement or policy) are handled by generating an associated event using entities 522, 512, 524, 525, 504 of the sensor system depicted in FIG. 5, and as well lead to a reconfiguration of the service by executing the service broker change processor.

FIG. 14 shows an embodiment of a system 1400 for enhancing a service delivery system with a multi-staged broker module for a placement of a service. The service delivery system is adapted for accessing at least two infrastructure systems which offer services for deploying and managing service resources. The at least two infrastructure systems may be operated by different service providers. The system comprises a first collection unit 1402 adapted for collecting static capabilities of said at least two infrastructure computing systems using said multi-staged broker, a second collection unit 1404 adapted for collecting dynamic capabilities of said at least two infrastructure computing systems using said multi-staged broker, and a combining module 1406 adapted for combining said static capabilities and said dynamic capabilities for determining a first most suitable infrastructure system for deploying a service requiring a computing environment satisfying attribute values of a service capability profile.

The system comprises also a deploying unit 1408 adapted for deploying said service on said first most suitable infrastructure system, a receiver 1410 adapted for receiving an event indicative of a change of one out of the group comprising said static capabilities, said dynamic capabilities, and said capability profile, a reassessment unit 1412 adapted for reassessing said determination regarding said most suitable infrastructure system and repeating said combining the static capabilities and said dynamic capabilities for determining a second most suitable infrastructure system for deploying said service satisfying said attribute values of said service capability profile, and a redeployment unit 1414 adapted for redeploying said service on said second most suitable infrastructure system.

It may be noted that the multi-staged broker module comprises all the above-mentioned elements 1402 to 1414.

FIG. 15 shows a cloud computing environment 1500 in which at least parts of the inventive concept may be deployed. A set of functional abstraction layers provided by a cloud computing environment is shown. It should be understood in advance that the components, layers, and functions shown in FIG. 15 are intended to be illustrative only and embodiments of the invention are not limited thereto. As depicted, the following layers and corresponding functions are provided: Hardware and software layer 1502 include hardware and software components. Examples of hardware components include: mainframes 1504; servers 1506; RISC (Reduced Instruction Set Computer) architecture based servers 1508; blade servers 1510; storage devices 1512; networks 1514 and networking components 1514. In some embodiments, software components include network application server software 1516 and/or database software 1518.

Virtualization layer 1520 provides an abstraction layer from which the following examples of virtual entities may be provided: virtual servers 1522; virtual storage 1524; virtual networks 1526, including virtual private networks; virtual applications and operating systems 1528; and virtual clients 1530. In one example, management layer 1532 may provide the functions described below. Resource provisioning 1534 provides dynamic procurement of computing resources and other resources that are utilized to perform tasks within the cloud computing environment. Metering and pricing 1536 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1538 provides access to the cloud computing environment for consumers and system administrators. Service level management 1540 provides cloud computing resource allocation and management such that required service levels are met. Service Level Agreement (SLA) planning and fulfillment 1542 provides pre-arrangement for, and procurement of, cloud computing resources for which a future requirement is anticipated in accordance with an SLA.

Workload layer 1544 provide examples of functionality for which the cloud computing environment may be utilized. Examples of workloads and functions which may be provided from this layer include: mapping and navigation 1546; software development and lifecycle management 1548; virtual classroom education delivery 1550; data analytics processing 1552; transaction processing 1554; and the system for enhancing a service delivery system with a multi-staged broker module 1556.

Embodiments of the invention may be implemented together with virtually any type of computer, regardless of the platform being suitable for storing and/or executing program code. FIG. 16 shows, as an example, a computing system 1600 suitable for executing program code related to the proposed method.

The computing system 1600 is only one example of a suitable computer system and is not intended to suggest any limitation as to the scope of use or functionality of embodiments of the invention described herein. Regardless, computer system 1600 is capable of being implemented and/or performing any of the functionality set forth hereinabove. In the computer system 1600, there are components, which are operational with numerous other general purpose or special purpose computing system environments or configurations. Examples of well-known computing systems, environments, and/or configurations that may be suitable for use with computer system/server 1600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 1600 may be described in the general context of computer system-executable instructions, such as program modules, being executed by a computer system 1600. Generally, program modules may include routines, programs, objects, components, logic, data structures, and so on that perform particular tasks or implement particular abstract data types. Computer system/server 1600 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 1600 is shown in the form of a general-purpose computing device. The components of computer system/server 1600 may include, but are not limited to, one or more processor 1602, a system memory 1604, and a bus 1606 that couples various system components including system memory 1604 to the processor 1602. Bus 1606 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 1600 typically includes a variety of computer system readable media. Such media may be any available media that is accessible by computer system/server 1600, and it includes both, volatile and non-volatile media, removable and non-removable media.

The system memory 1604 may include computer system readable media in the form of volatile memory, such as random access memory (RAM) 1608 and/or cache memory 1610. Computer system/server 1600 may further include other removable/non-removable, volatile/non-volatile computer system storage media. By way of example only, storage system 1612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 1606 by one or more data media interfaces. As will be further depicted and described below, memory 1604 may include at least one program product having a set (e.g., at least one) of program modules that are configured to carry out the functions of embodiments of the invention.

One or more program 1614, having a set (at least one) of program modules 1616, may be stored in memory 1604 by way of example, and not limitation, as well as an operating system, one or more application programs, other program modules, and program data. Each of the operating system, one or more application programs, other program modules, and program data or some combination thereof, may include an implementation of a networking environment. One or more program 1614 having at least one program module 1616 can generally carry out the functions and/or methodologies of embodiments of the invention as described herein, e.g. for enhancing a service delivery system with a multi-staged broker.

The computer system/server 1600 may also communicate with one or more external devices 1618 such as a keyboard, a pointing device, a display 1620, etc.; one or more devices that enable a user to interact with computer system/server 1600; and/or any devices (e.g., network card, modem, etc.) that enable computer system/server 1600 to communicate with one or more other computing devices. Such communication can occur via Input/Output (I/O) interfaces 1617. Still yet, computer system/server 1600 may communicate with one or more networks such as a local area network (LAN), a general wide area network (WAN), and/or a public network (e.g., the Internet) via network adapter 1622. As depicted, network adapter 1622 may communicate with the other components of computer system/server 1600 via bus 1606. It should be understood that although not shown, other hardware and/or software components could be used in conjunction with computer system/server 1600. Examples, include, but are not limited to: microcode, device drivers, redundant processing units, external disk drive arrays, RAID systems, tape drives, and data archival storage systems, etc.

Additionally, the system 1400 for enhancing a service delivery system with a multi-staged broker may be attached to the bus system 1606. System 1440 in such embodiment can be implemented with use, e.g., of an Application Specific Integrated Circuit (ASIC) or a Field Programmable Gate Army (FPGA).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect can include a method for enhancing a service delivery system with a multi-staged broker for a placement of a service, where said service delivery system accesses at least two infrastructure systems offering services for deploying and managing service resources, where said at least two infrastructure systems are operated by different service providers. The method can include collecting static capabilities of the at least two infrastructure computing systems using said multi-staged broker. The method can also include collecting dynamic capabilities of said at least two infrastructure computing systems using said multi-staged broker. The method can also include combining said static capabilities and said dynamic capabilities for determining a first most suitable infrastructure system for deploying a service requiring a computing environment satisfying attribute values of a service capability profile. The method can also include deploying said service on said first most suitable infrastructure system. The method can also include receiving an event indicative of a change of one out of the group including said static capabilities, said dynamic capabilities, and said capability profile. The method can also include reassessing said determination regarding said most suitable infrastructure system and repeating said combining said static capabilities and said dynamic capabilities for determining a second most suitable infrastructure system for deploying said service satisfying said attribute values of said service capability profile. The method can also includes redeploying said service on said second most suitable infrastructure system. Other embodiments of this aspect include corresponding computer systems, apparatus, and computer programs recorded on one or more computer storage devices, each configured to perform the actions of the methods.

Implementations may include one or more of the following features. The method according where said collecting static capabilities includes receiving messages by said multi-staged broker from a sensory adapter connected to at least one of said at least two infrastructure systems, where said messages are indicative of static characteristic values of said at least two infrastructure systems. The method may also include receiving messages by said multi-staged broker from said sensory adapter connected to at least one of said at least two infrastructure systems, where said messages are indicative of continuously changing characteristic values of said at least two infrastructure systems. The method may also include creating at least one capability record representing logically names of capabilities, types of capabilities and/or related type capability values of said at least two infrastructure systems. The method may also include creating at least one service provider record identifying said service provider by a unique identifier. The method may also include determining by said multi-staged broker a list of potential infrastructure systems out of which said most suitable infrastructure system is selected for a deployment of said service. The method may also include said method where said capability profile of said service includes at least one out of the group including a service description, a service provider name, a unique identifier of a service provider, a capability type name, a capability type identifier, a performance indicator, an operating system indicator, a storage amount indicator, a scaling indicator, a cost indicator, a hardware architecture indicator, a hypervisor type indicator, and an availability guarantee indicator. The method may also include said method where said redeploying said service on said first most suitable infrastructure system includes stopping said deployment of said service on said first most suitable infrastructure system. The method may also include said method where said redeploying said service on said first most suitable infrastructure system includes deleting said service on said first most suitable infrastructure system. The method may also include said method where said reassessing said determination regarding said most suitable infrastructure system is performed periodically and/or at predefined points in time and/or upon receiving said event.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method comprising:
    collecting static capabilities of at least two infrastructure computing systems using a multi-staged broker,
    collecting dynamic capabilities of said at least two infrastructure computing systems using said multi-staged broker,
    combining said static capabilities and said dynamic capabilities for determining a first most suitable infrastructure system for deploying a service requiring a computing environment satisfying attribute values of a service capability profile,
    deploying said service on said first most suitable infrastructure system, receiving an event indicative of a change, reassessing said determination regarding said most suitable infrastructure system and repeating said combining said static capabilities and said dynamic capabilities for determining a second most suitable infrastructure system for deploying said service satisfying said attribute values of said service capability profile, and redeploying said service on said second most suitable infrastructure system, wherein said redeploying said service on said first most suitable infrastructure system comprises stopping said deploying of said service on said first most suitable infrastructure system, wherein the method includes receiving from an owner of the service, data defined by the owner, generating based on the owner defined data, a service definition record, wherein the service definition record generated based on the owner defined data includes a service definition ID, a service name, a service part identifier, and for first and second different parts of the service, owner defined requirements, wherein the owner defined requirements include first requirements for the first part of the service and second requirements for the second part of the service, wherein the service definition record further includes an owner defined policy.

2. The method of claim 1, wherein the stopping said deploying of said service on the first most suitable infrastructure system includes stopping said deploying of said service on said first most suitable infrastructure system without deleting of said service on said first most suitable infrastructure system, wherein the method includes later restarting said service on said first most suitable infrastructure system.

3. A method comprising:

collecting first changing capabilities of at least two infrastructure computing systems using a multi-staged broker, collecting second changing capabilities of said at least two infrastructure computing systems using said multi-staged broker, combining said first changing capabilities and said second changing capabilities for determining a first most suitable infrastructure system for deploying a service requiring a computing environment satisfying attribute values of a service capability profile, deploying said service on said first most suitable infrastructure system, receiving an event indicative of a change, reassessing said determination regarding said most suitable infrastructure system and repeating said combining said first changing capabilities and said second changing capabilities for determining a second most suitable infrastructure system for deploying said service satisfying said attribute values of said service capability profile, and redeploying said service on said second most suitable infrastructure system, wherein said redeploying said service on said first most suitable infrastructure system comprises stopping said deploying of said service on said first most suitable infrastructure system, wherein the method includes receiving from an owner of the service, data defined by the owner, generating based on the owner defined data, a service definition record, wherein the service definition record generated based on the owner defined data includes a service definition ID, a service name, a service part identifier, and for first and second different parts of the service, owner defined requirements, wherein the owner defined requirements include first requirements for the first part of the service and second requirements for the second part of the service, wherein the service definition record further includes an owner defined policy.

4. The method according to claim 3, wherein said redeploying said service on said first most suitable infrastructure system comprises deleting said service on said first most suitable infrastructure system.

5. The method of claim 3, wherein the method comprises a selecting a first infrastructure system for deployment of the first part of the service based on the first requirements and selecting a second infrastructure system for deployment of the second part of the service based on the second requirements.

6. The method of claim 3, wherein the method comprises a selecting a first infrastructure system for deployment of the first part of the service based on the first requirements and selecting a second infrastructure system for deployment of the second part of the service based on the second requirements, and wherein the method includes simultaneously running the first part of the service on the first infrastructure system and the second part of the service on the second infrastructure system, wherein the method includes discontinuing running of the first part of the service on the first infrastructure system in response to an outage of the first infrastructure system and continuing to run the second part of the service on the second infrastructure system during the outage on the first infrastructure system.

7. The method of claim 3, wherein the method includes receiving from the owner of the service, owner defined requirements and owner policies defined by the owner for the service, wherein the method includes performing a matching of capabilities of candidate infrastructure systems against the owner defined requirements defined by the owner for the service and performing a filtering of the candidate infrastructure systems in dependence on the owner defined policies for the service defined by the owner.

8. The method of claim 3, wherein the service definition record further includes an owner defined policy, wherein the owner defined requirements are defined on a per service part basis and wherein the owner defined policy is defined by the owner on a per service basis so that for a given service having first and second parts there is defined first requirements for the first service part, second requirements for the second service part, and a policy for the service that comprises the first and second service parts, wherein the method includes receiving from the owner of the service the first requirements for the first service part, second requirements for the second service part, and a policy for the service that comprises the first and second service parts, wherein the method includes performing a matching of capabilities of candidate infrastructure systems against the owner defined first requirements and second requirements defined by the owner for the service and performing a filtering of the candidate infrastructure systems in dependence on the owner defined policy for the service defined by the owner.

9. The method of claim 3, wherein the method includes receiving from an owner of the service data defined by the owner, generating based on the owner defined data, a service definition record, wherein the service definition record generated based on the owner defined data includes a service definition ID, a service name, a service part identifier, and for first and second different parts of the service, owner defined requirements, wherein the owner defined requirements include first requirements for the first part of the service and second requirements for the second part of the service, wherein the service definition record further includes an owner defined policy, wherein the owner defined requirements are defined on a per service part basis and wherein the owner defined policy is defined by the owner on a per service basis so that for a given service having first and second parts there is defined first requirements for the first service part, second requirements for the second service part, and a policy for the service that comprises the first and second service parts, wherein the method includes receiving from the owner of the service the first requirements for the first service part, second requirements for the second service part, and a policy for the service that comprises the first and second service parts, wherein the method includes performing a matching of capabilities of candidate infrastructure systems against the owner defined first requirements and second requirements defined by the owner for the service and performing a filtering of the candidate infrastructure systems in dependence on the owner defined policy for the service defined by the owner, wherein the method includes creating at least one capability record specifying names of capabilities of respective infrastructure systems, types of capabilities, and capability values, wherein the method includes receiving from an owner of the service data defined by the owner, generating based on the owner defined data, a service definition record, wherein the service definition record generated based on the owner defined data includes a service definition ID, a service name, a service part identifier, and for first and second different parts of the service, owner defined requirements, wherein the owner defined requirements include first requirements for the first part of the service and second requirements for the second part of the service, wherein the service definition record further includes an owner defined policy, wherein owner defined requirements of the service definition record include optional conditions defined by the owner and mandatory conditions defined by the owner, wherein the method comprises a selecting a first infrastructure system for deployment of the first part of the service based on the first requirements and selecting a second infrastructure system for deployment of the second part of the service based on the second requirements, and wherein the method includes simultaneously running the first part of the service on the first infrastructure system and the second part of the service on the second infrastructure system, wherein the method includes discontinuing running of the first part of the service on the first infrastructure system in response to an outage of the first infrastructure system and continuing to run the second part of the service on the second infrastructure system during the outage on the first infrastructure system.

10. The method according to claim 3, wherein said collecting first changing capabilities comprises:
receiving messages by said multi-staged broker from a sensory adapter connected to at least one of said at least two infrastructure systems, wherein said messages are indicative of non-continuously changing characteristic values of said at least two infrastructure systems.

11. The method according to claim 3, wherein said collecting second changing capabilities comprises:
receiving messages by said multi-staged broker from a sensory adapter connected to at least one of said at least two infrastructure computing systems, wherein said messages are indicative of continuously changing characteristic values of said at least two infrastructure systems.

12. The method according to claim 3, wherein said combining said first changing capabilities and said second changing capabilities comprises:
creating at least one capability record representing logically names of capabilities, types of capabilities and/or related type capability values of said at least two infrastructure systems;
creating at least one service provider record identifying said service provider by a unique identifier; and
determining by said multi-staged broker a list of potential infrastructure systems out of which said most suitable infrastructure system is selected for a deployment of said service.

13. The method according to claim 3, wherein said service capability profile of said service includes each of a service description, a service provider name, a unique identifier of a service provider, a capability type name, a capability type identifier, a performance indicator, an operating system indicator, a storage amount indicator, a scaling indicator, a cost indicator, a hardware architecture indicator, a hypervisor type indicator, and an availability guarantee indicator.

14. The method according to claim 3, wherein said redeploying said service on said first most suitable infrastructure system comprises deleting said service on said first most suitable infrastructure system.

15. The method according to claim 3, wherein the event indicative of a change includes each of (a) an event indicative of a change of said first changing capabilities, (b) an event indicative of a change of said second changing capabilities, and (c) an event indicative of a change of said service capability profile.

16. The method according to claim 3, wherein for successive iterations of said reassessing said determination regarding said most suitable infrastructure system is performed according to each of: (a) periodically, (b) at predefined points in time, and (c) upon receiving said event.

17. The method according to claim 3, wherein said collecting first changing capabilities comprises:
receiving messages by said multi-staged broker from a sensory adapter connected to at least one of said at least two infrastructure systems, wherein said messages are indicative of non-continuously changing characteristic values of said at least two infrastructure systems, wherein said collecting first changing capabilities comprises:
receiving messages by said multi-staged broker from a sensory adapter connected to at least one of said at least two infrastructure systems, wherein said messages are indicative of non-continuously changing characteristic values of said at least two infrastructure systems, wherein said collecting second changing capabilities comprises:
receiving messages by said multi-staged broker from said sensory adapter connected to at least one of said at least two infrastructure computing systems, wherein said messages are indicative of continuously changing characteristic values of said at least two infrastructure systems.

18. The method according to claim 3, wherein said collecting first changing capabilities comprises:
receiving messages by said multi-staged broker from a sensory adapter connected to at least one of said at least two infrastructure systems, wherein said messages are indicative of non-continuously changing characteristic values of said at least two infrastructure systems, wherein said collecting first changing capabilities comprises:

receiving messages by said multi-staged broker from a sensory adapter connected to at least one of said at least two infrastructure systems, wherein said messages are indicative of non-continuously changing characteristic values of said at least two infrastructure systems, wherein said collecting second changing capabilities comprises:

receiving messages by said multi-staged broker from said sensory adapter connected to at least one of said at least two infrastructure computing systems, wherein said messages are indicative of continuously changing characteristic values of said at least two infrastructure systems, wherein the event indicative of a change includes each of (a) an event indicative of a change of said first changing capabilities, (b) an event indicative of a change of said second changing capabilities, and (c) an event indicative of a change of said service capability profile.

19. The method of claim 3, wherein the stopping said deploying of said service on the first most suitable infrastructure system includes stopping said deploying of said service on said first most suitable infrastructure system without deleting of said service on said first most suitable infrastructure system, wherein the method includes later restarting said service on said first most suitable infrastructure system.

* * * * *